W. W. DENTON.
VEHICLE BRAKE.
APPLICATION FILED FEB. 10, 1912.
1,057,042.
Patented Mar. 25, 1913.
2 SHEETS—SHEET 1.
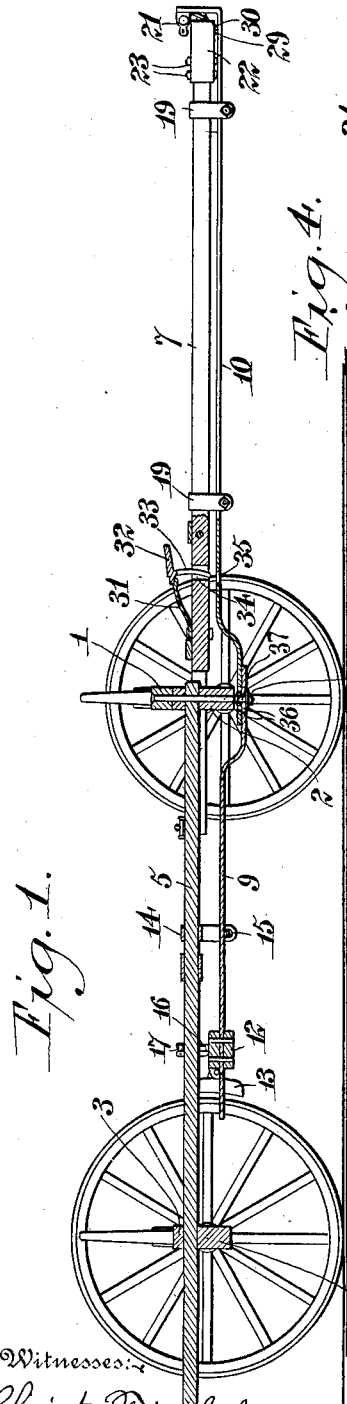
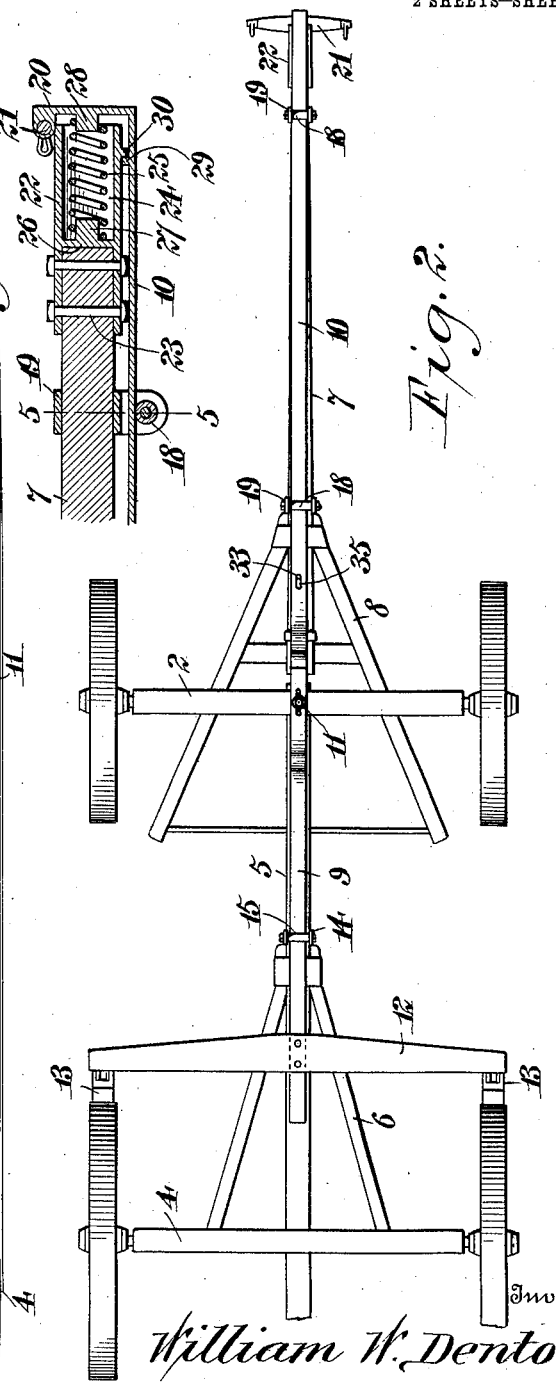

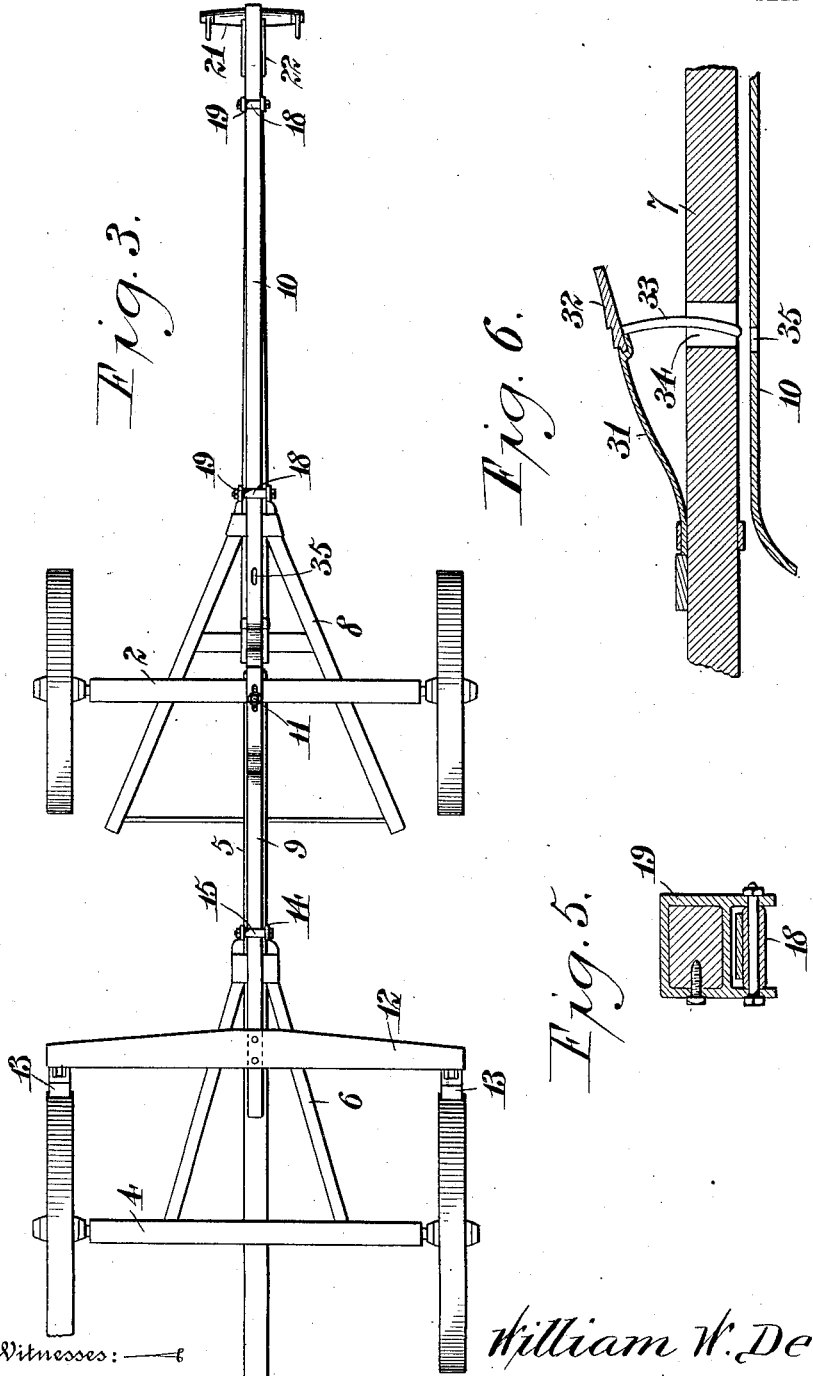

UNITED STATES PATENT OFFICE.

WILLIAM W. DENTON, OF ANDALUSIA, ALABAMA.

VEHICLE-BRAKE.

1,057,042.　　　　Specification of Letters Patent.　　Patented Mar. 25, 1913.

Application filed February 10, 1912.　Serial No. 676,738.

*To all whom it may concern:*

Be it known that I, WILLIAM W. DENTON, a citizen of the United States, residing at Andalusia, in the county of Covington and State of Alabama, have invented new and useful Improvements in Vehicle-Brakes, of which the following is a specification.

This invention relates to vehicle brakes, and has for an object to provide a brake which will be automatic in action when the vehicle is traveling down grade.

Another object of the invention is to provide means whereby the brake will readily adjust itself to a released position after the draft animals have assumed their normal pulling positions immediately subsequent to the application of the brake.

Another object of the invention is to provide means adapted to be manually controlled whereby the brake can be rendered inoperative at the will of the driver of the vehicle.

In the drawings, forming a portion of this specification and in which like numerals of reference indicate similar parts in the several views:—Figure 1 is a vertical longitudinal section through the vehicle showing the application of the brake thereto. Fig. 2 is a bottom plan view showing the brake beam in its released position. Fig. 3 is a view similar to Fig. 2 showing the brake beam in its applied position. Fig. 4 is a section on an enlarged scale through the pole cap. Fig. 5 is a section on line 5—5 of Fig. 4. Fig. 6 is an enlarged section through a portion of the pole showing the brake locking means applied thereto.

The vehicle shown herein includes the front bolster 1 and the axle 2, and the rear bolster 3 and the axle 4, the said axles being connected by the reach pole 5 in the usual manner. The rear axle is connected to the reach pole by the rear hounds 6. The front axle is connected with the draft pole 7 by the front hounds 8.

The brake forming my improved invention comprises a rear section 9 and a front section 10, the latter being adjustably connected with the former, at 11. The rear section 9 has secured thereto a brake beam 12 which operatively supports the brake shoes 13 which may be of any suitable well known construction which will permit of their effective contact with the rear wheels of the vehicle when the brake beam is in its applied position. The section 9 of the draft member is slidably mounted in one or more sleeves 14 which are secured to the reach pole 5, the said sleeves having mounted therein antifriction rollers 15 on which the section 9 is adapted to freely slide. The brake beam 12 supports brackets 16 which embrace the bars of the rear hounds of the vehicle, and as shown, the brackets are provided with antifriction rollers 17 to slidably receive the bars.

The front section 10 of the draft bar of the brake is adapted to slide over the rollers 18 in the brackets 19 on the draft pole 7. The forward end of the section 10 of the brake draft bar is provided with a vertically disposed portion 20 to which is operatively connected the neck yoke 21. The neck yoke is slidable on the cap piece 22 which is secured, at 23, to the front of the draft pole 7. The said cap piece 22 is provided with a socket 24 in which is mounted a heavy extensile spring 25. One end of this spring bears against the wall 26 of the socket 22 and at this end the spring embraces a stud 27. The opposite end of the spring extends slightly beyond the cap piece and it bears directly against the portion 20 of the section 10. The said portion 20 is provided with a stud 28 which is located in line with the stud 27. The stud 28 is embraced by the outer end of the said extensile spring 25. Under the action of the spring 25 the draft bar of the brake beam 12 is yieldingly held in a released position so that the shoes on the brake beam are disengaged from the rear wheels of the vehicle. To prevent undue strain on the draft bar of the brake beam 12, I provide the section 10 of the draft bar with a stop 29 which is designed to engage against a similar stop 30 on the underside of the cap piece 22, the engagement of the two stops serving positively to limit the movement of the draft bar in one direction.

From the construction described it is obvious that when the team is traveling down grade the draft animals will be backed, carrying therewith the sliding neck yoke 21, whereby the brake shoes of the beam 12 will be automatically applied to the rear wheels of the vehicle. In order that the brake mechanism can be rendered inoperative, I provide the draft pole 7 of the vehicle with a flat leaf spring 31. This spring is provided with a free foot engaging portion 32 which is disposed in such proximity to the front axle of the vehicle as to permit it to be engaged by the foot of the operator and depressed. The spring has operatively connected therewith a lock pin 33. This pin is slidable in a passage 34 in the draft pole 7 and it may be extended into the keeper passage 35 in the section 10 of the brake beam draft bar. When the spring is actuated to cause the pin 33 to engage in the keeper passage 35 the brake beam draft bar is held positively against sliding movement. It is stated that the sections 9 and 10 of the brake beam draft bar are adjustably connected together at 11. Specifically speaking the sections 9 and 10 are provided with longitudinal passages 36 which may be interchangeably associated with each other so as to receive the combined pivot and retaining bolt 37.

I claim:

A vehicle brake comprising a draft pole and a movable brake beam, a draft bar including front and rear sections slidably supported upon the draft pole, the said rear section being connected with the said beam, the said front section being provided at its forward end with an integral vertically disposed portion, a stud formed integral with the inner face of said portion, a member having a socket connected to the forward end of the draft pole and provided with a stud located in line and opposite the former mentioned stud, a spring disposed in the socket of the said member and having its opposite outermost convolutions embracing said studs, axially alining the spring within the socket, said spring being adapted to move the draft bar to beam releasing position, and studs integrally formed with the underneath face portion of said member and the inner face of the said front section and adapted to limit the sliding movement of the draft bar in one direction.

In testimony whereof I affix my signature in presence of two witnesses.

WILLIAM W. DENTON.

Witnesses:
J. W. HUMPHRIES,
J. Z. HUTH.

Copies of this patent may be obtained for five cents each, by addressing the "Commissioner of Patents, Washington, D. C."